(12) United States Patent  
Li et al.

(10) Patent No.: US 8,295,475 B2  
(45) Date of Patent: Oct. 23, 2012

(54) SELECTIVE GLITCH DETECTION, CLOCK DRIFT COMPENSATION, AND ANTI-CLIPPING IN AUDIO ECHO CANCELLATION

(75) Inventors: Qin Li, Seattle, WA (US); Chao He, Redmond, WA (US); Wei-Ge Chen, Sammamish, WA (US); Mu Han, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1463 days.

(21) Appl. No.: 11/332,500

(22) Filed: Jan. 13, 2006

(65) Prior Publication Data

US 2007/0165838 A1    Jul. 19, 2007

(51) Int. Cl.  
*H04M 9/08* (2006.01)

(52) U.S. Cl. .............................. 379/406.08; 379/406.01

(58) Field of Classification Search .............. 379/3, 406, 379/406.01–406.16, 410, 391, 382, 66, 83, 379/93, 95, 96; 455/570; 370/286  
See application file for complete search history.

(56) References Cited

U.S. PATENT DOCUMENTS

| | | | |
|---|---|---|---|
| 4,039,753 | A | 8/1977 | Balogh et al. |
| 4,069,395 | A | 1/1978 | Nash |
| 4,275,398 | A | 6/1981 | Parker et al. |
| 4,359,606 | A | 11/1982 | Shoichi |
| 4,636,586 | A | 1/1987 | Schiff |
| 4,696,015 | A | 9/1987 | Palicot et al. |
| 4,696,032 | A | 9/1987 | Levy |
| 5,099,472 | A | 3/1992 | Townsend et al. |
| 5,263,019 | A | 11/1993 | Chu |
| 5,305,307 | A | 4/1994 | Chu |
| 5,323,459 | A | 6/1994 | Hirano |

(Continued)

FOREIGN PATENT DOCUMENTS

GB    2269968    3/1996

(Continued)

OTHER PUBLICATIONS

Ahgren, "Teleconferencing, System Identification and Array Processing," IT Licentiate Thesis, Uppsala University Department of Information Technology, <http://www.it.uu.se/research/publications/lic/2001-012/2001-012.pdf>, 75 pages, Oct. 2001.

(Continued)

*Primary Examiner* — Md S Elahee  
*Assistant Examiner* — Akelaw Teshale  
(74) *Attorney, Agent, or Firm* — Klarquist Sparkman, LLP (57) ABSTRACT

The quality and robustness of audio echo cancellation is enhanced by selectively applying glitch recovery processes based on a quality measurement of the relative offset between capture and render audio streams. For example, large and small glitch detection is enabled for low relative offset variance; large glitch detection is enabled in a medium range of relative offset variance; and neither enabled at high variance. Further, a fast glitch recovery process suspends updating the adaptive filter coefficients of the audio echo cancellation while buffers are re-aligned to recover from the glitch, so as to avoid resetting the adaptive filter. When clock drift exists between capture and render audio streams, a multi-step compensation method is applied to improve AEC output quality in case the drifting rate is low; and a resampler is used to compensate the drift in case the drifting rate is high. An anti-clipping process detects clipping of the signals, and also suspends adaptive filter updating during clipping.

21 Claims, 4 Drawing Sheets

U.S. PATENT DOCUMENTS

| | | | |
|---|---|---|---|
| 5,353,348 A | 10/1994 | Sendyk et al. | |
| 5,430,796 A | 7/1995 | Komoda et al. | |
| 5,454,041 A | 9/1995 | Davis | |
| 5,477,534 A | 12/1995 | Kusano | |
| 5,542,000 A | 7/1996 | Semba | |
| 5,559,793 A | 9/1996 | Maitra et al. | |
| 5,619,582 A | 4/1997 | Oltman et al. | |
| 5,646,990 A | 7/1997 | Li | |
| 5,666,407 A | 9/1997 | Pfeifer | |
| 5,680,450 A | 10/1997 | Dent et al. | |
| 5,721,730 A | 2/1998 | Genter | |
| 5,923,749 A | 7/1999 | Gustafsson et al. | |
| 6,002,776 A | 12/1999 | Bhadkamkar et al. | |
| 6,044,150 A | 3/2000 | Rigstad et al. | |
| 6,078,645 A | 6/2000 | Cai et al. | |
| 6,081,722 A | 6/2000 | Duque-Anton et al. | |
| 6,169,728 B1 | 1/2001 | Perreault et al. | |
| 6,205,124 B1 | 3/2001 | Hamdi | |
| 6,212,273 B1 | 4/2001 | Hemkumar et al. | |
| 6,215,880 B1 | 4/2001 | Hasegawa | |
| 6,219,418 B1 * | 4/2001 | Eriksson et al. | 379/406.08 |
| 6,324,170 B1 | 11/2001 | McClennon et al. | |
| 6,377,679 B1 | 4/2002 | Hashimoto et al. | |
| 6,418,203 B1 | 7/2002 | Marcie | |
| 6,535,609 B1 | 3/2003 | Finn et al. | |
| 6,574,336 B1 | 6/2003 | Kirla | |
| 6,583,821 B1 | 6/2003 | Durand | |
| 6,707,910 B1 | 3/2004 | Valve et al. | |
| 6,724,736 B1 | 4/2004 | Azriel | |
| 6,738,358 B2 | 5/2004 | Bist et al. | |
| 6,748,086 B1 | 6/2004 | Venkatesh et al. | |
| 6,778,671 B1 * | 8/2004 | Graumann | 381/66 |
| 6,799,062 B1 | 9/2004 | Piket et al. | |
| 6,868,157 B1 | 3/2005 | Okuda | |
| 7,031,269 B2 | 4/2006 | Lee | |
| 7,085,370 B1 * | 8/2006 | Arana-Manzano et al. | 379/377 |
| 7,120,259 B1 * | 10/2006 | Ballantyne et al. | 381/71.12 |
| 7,433,463 B2 | 10/2008 | Alves et al. | |
| 2002/0090008 A1 | 7/2002 | Cioffi et al. | |
| 2002/0101982 A1 | 8/2002 | Elabd | |
| 2003/0174847 A1 | 9/2003 | Lane et al. | |
| 2003/0206624 A1 | 11/2003 | Domer et al. | |
| 2003/0206625 A9 | 11/2003 | Ahmad | |
| 2004/0001597 A1 | 1/2004 | Marton | |
| 2004/0001598 A1 | 1/2004 | Balan et al. | |
| 2004/0013275 A1 | 1/2004 | Balan et al. | |
| 2004/0081315 A1 * | 4/2004 | Boland et al. | 379/406.01 |
| 2004/0125942 A1 | 7/2004 | Beaucoup et al. | |
| 2004/0141528 A1 | 7/2004 | LeBlanc et al. | |
| 2005/0223113 A1 | 10/2005 | Hoffmann | |
| 2006/0018459 A1 | 1/2006 | McCree | |
| 2007/0019802 A1 | 1/2007 | Ubriaco et al. | |
| 2007/0041324 A1 | 2/2007 | Shenoi | |
| 2007/0047738 A1 | 3/2007 | Ballantyne et al. | |
| 2007/0165837 A1 | 7/2007 | Zhong et al. | |
| 2007/0165838 A1 | 7/2007 | Li et al. | |
| 2007/0263849 A1 | 11/2007 | Stokes et al. | |
| 2007/0263850 A1 | 11/2007 | Stokes et al. | |
| 2007/0280472 A1 | 12/2007 | Stokes et al. | |
| 2009/0207763 A1 | 8/2009 | Li et al. | |

FOREIGN PATENT DOCUMENTS

| | | |
|---|---|---|
| WO | WO 2007147033 A2 | 12/2007 |

OTHER PUBLICATIONS

Buchner et al., "Wave-Domain Adaptive Filtering: Acoustic Echo Cancellation for Full-Duplex Systems Based on Wave-Field Synthesis," Proceedings of the 2004 IEEE International Conference on Acoustics, Speech, and Signal Processing, vol. 4, 2004, pp. IV-117-IV-120.

CISCO, "Configuring Echo Cancellation," http://www.cisco.com/en/US/docs/ios/12_3/vvf_c/voice_port_configuration_guide/ch5_echo.html, © 1992-2008, 17 pages.

Ditech Communications, "Ditech's Voice Quality Assurance™," <http://www.ditechcom.com/platforms/DataSheets/OV_VQA.pdf>, 2 pages, 2005.

"Echo Cancellation," Chapter 4, pp. 1-8 (1990).

Frunze, "Echo Cancellation Demystified," Technical Paper, SPIRIT Corp., undated, 13 pages.

Herbordt et al., "Joint Optimization of Lcmv Beamforming and Acoustic Echo Cancellation," <http://www.slt.atr.jp/~wherbord/archives/mypub/HerbordtJoint_optimization_of_LCMV_beamforming_and_acoustic_echo_cancellation.pdf>, 4 pages.

Hoshuyama, "Nonlinear Echo Suppression Technology Enabling Quality Handsfree Talk for Compact Equipment," NEC Technical Journal, vol. 2, No. 2, 2007, pp. 27-30.

Knowles Acoustics, "Beat the Noise and Echo, Communicate Anywhere via VoIP," <http://www.speechtechmag.com/whitepapers/knowlesa.pdf>, 11 pages, 2004.

Yensen et al., "Echo Target Determination Using Acoustic Round Trip Delay for Voice Over IP Conferences," Proceedings of the 1999 IEEE International Symposium on Circuits and Systems, vol. 4, 1999, pp. IV-348-IV-351.

Riley, W.J., "Techniques for Frequency Stability Analysis", IEEE International Frequency Control Symposium, May 4, 2003, pp. 10, 30, and 33.

* cited by examiner

Software 880 Implementing Audio Echo Cancellation

SELECTIVE GLITCH DETECTION, CLOCK DRIFT COMPENSATION, AND ANTI-CLIPPING IN AUDIO ECHO CANCELLATION

BACKGROUND

Acoustic Echo Cancellation (AEC) is a digital signal processing technology which is used to remove the acoustic echo from a speaker phone in two-way or multi-way communication systems, such as traditional telephone or modem internet audio conversation applications.

Figure 1:
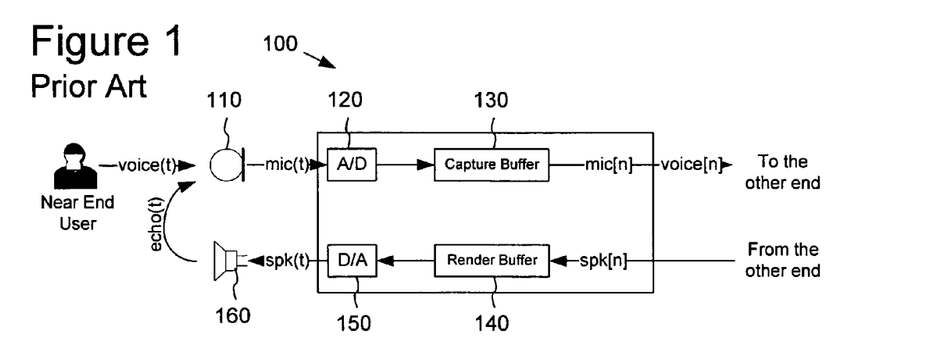
FIG. 1 is a block diagram illustrating one end of a typical two-way communication system in the prior art.

FIG. 1 illustrates an example of one end 100 of a typical two-way communication system, which includes a capture stream path and a render stream path for the audio data in the two directions. The other end is exactly the same. In the capture stream path in the figure, an analog to digital (A/D) converter 120 converts the analog sound captured by microphone 110 to digital audio samples continuously at a sampling rate ($fs_{mic}$). The digital audio samples are saved in capture buffer 130 sample by sample. The samples are retrieved from capture buffer in frame increments (herein denoted as "mic[n]"). Frame here means a number (n) of digital audio samples. Finally, samples in mic[n] are processed and sent to the other end.

In the render stream path, the system receives audio samples from the other end, and places them into a render buffer 140 in periodic frame increments (labeled "spk[n]" in the figure). Then the digital to analog (D/A) converter 150 reads audio samples from the render buffer sample by sample and converts them to analog signal continuously at a sampling rate, $fs_{spk}$. Finally, the analog signal is played by speaker 160.

As already mentioned, the system includes two buffers: the capture buffer 120 and the render buffer 140. They are necessary because in most communication systems samples in buffers are read and written at different paces. For example, the A/D converter 120 outputs audio samples to the capture buffer sample by sample continuously, but the system retrieves audio samples from the capture buffer frame by frame. This buffering introduces delay. For example, a sample generated by the A/D converter will stay in capture buffer for a short period of time before it is read out. A similar thing happens for the render stream as well. As a special case, if samples in buffers are read and written at the same pace, these buffers are not needed. But, the buffers are always needed in practical systems.

In systems such as that depicted by FIG. 1, the near end user's voice is captured by the microphone 110 and sent to the other end. At the same time, the far end user's voice is transmitted through the network to the near end, and played through the speaker 160 or headphone. In this way, both users can hear each other and two-way communication is established. But, a problem occurs if a speaker is used instead of a headphone to play the other end's voice. For example, if the near end user uses a speaker as shown in FIG. 1, his microphone captures not only his voice but also an echo of the sound played from the speaker (labeled as "echo(t)"). In this case, the mic[n] signal that is sent to the far end user includes an echo of the far end user's voice. As the result, the far end user would hear a delayed echo of his or her voice, which is likely to cause annoyance and provide a poor user experience to that user.

Practically, the echo echo(t) can be represented by speaker signal spk(t) convolved by a linear response g(t) (assuming the room can be approximately modeled as a finite duration linear plant) as per the following equation:

$$\text{echo}(t) = spk(t) * g(t) = \int_0^{T_e} g(\tau) \cdot spk(t - \tau) d\tau \quad (1)$$

where * means convolution, $T_e$ is the echo length or filter length of the room response.

Figure 2:
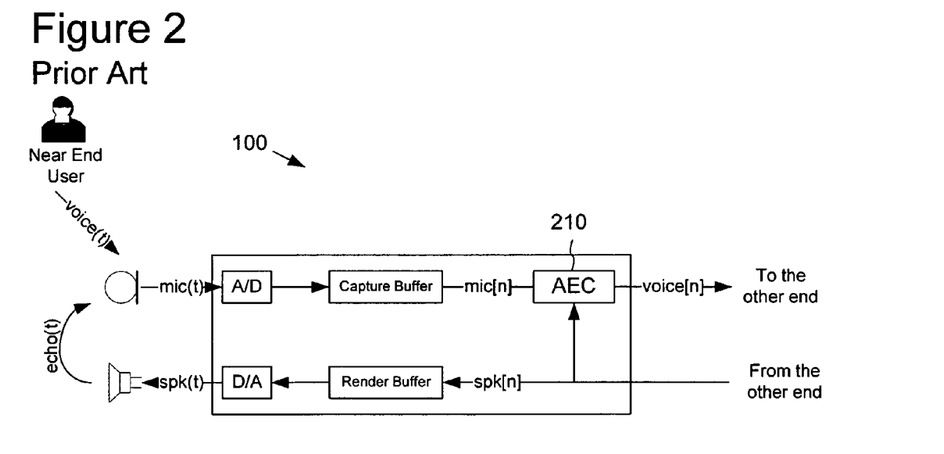
FIG. 2 is a block diagram of the two-way communication system of FIG. 1 with audio echo cancellation.

In order to remove the echo for the remote user, AEC 210 is added in the system as shown in FIG. 2. When a frame of samples in the mic[n] signal is retrieved from the capture buffer 130, they are sent to the AEC 210. At the same time, when a frame of samples in the spk[n] signal is sent to the render buffer 140, they are also sent to the AEC 210. The AEC 210 uses the spk[n] signal from the far end to predict the echo in the captured mic[n] signal. Then, the AEC 210 subtracts the predicted echo from the mic[n] signal. This difference or residual is the clear voice signal (voice[n]), which is theoretically echo free and very close to near end user's voice (voice (t)).

Figure 3:
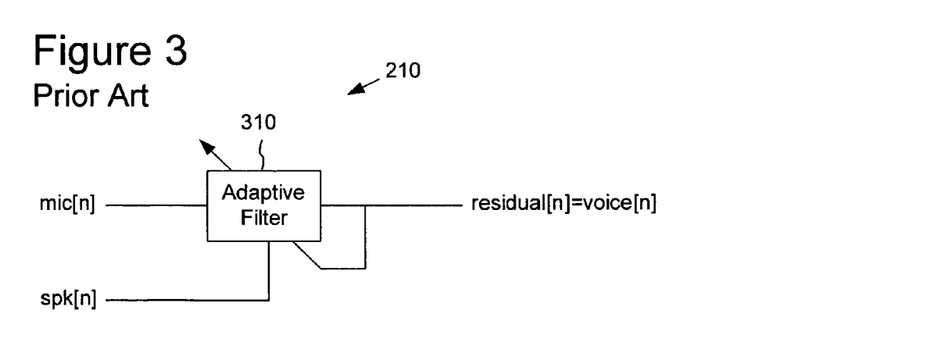
FIG. 3 is a block diagram of an implementation of audio echo cancellation based on an adaptive filter.

FIG. 3 depicts an implementation of the AEC 210 based on an adaptive filter 310. The AEC 210 takes two inputs, the mic[n] and spk[n] signals. It uses the spk[n] signal to predict the mic[n] signal. The prediction residual (difference of the actual mic[n] signal from the prediction based on spk[n]) is the voice[n] signal, which will be output as echo free voice and sent to the far end.

The actual room response (that is represented as g(t) in the above convolution equation) usually varies with time, such as due to change in position of the microphone 110 or speaker 160, body movement of the near end user, and even room temperature. The room response therefore cannot be predetermined, and must be calculated adaptively at running time. The AEC 210 commonly is based on adaptive filters such as Least Mean Square (LMS) adaptive filters 310, which can adaptively model the varying room response.

SUMMARY

The following Detailed Description presents various ways to enhance AEC quality and robustness in two-way communication systems. In particular, an AEC implementation is described that more accurately aligns the microphone and speaker signals (i.e., aligns the speaker signal samples from which the echo in the current microphone signal sample is predicted) to account for glitches, clock drift and clipping that could otherwise cause poor AEC quality.

In one described AEC implementation, the AEC aligns the microphone and speaker signals based on calculation of a relative sample offset of the signals. In addition, the AEC calculates measurements to assess the quality of the relative sample offset, such as clock drifting rate, variance and number of frames used in the calculation. Based on these quality measurements, the AEC categorizes the quality of the relative sample offset of the signals, and determines whether to apply certain glitch detection and compensation behaviors accordingly. When the variance measurement shows a high noise level for example, the AEC categorizes the quality of the relative sample offset measurement as not suitable for small glitch detection, or in very poor quality environments may determine the quality is not suitable to apply any of the glitch detection and compensation techniques.

For glitch detection, the described AEC implementation detects small and large glitches. Large glitches are discontinuities larger than a threshold size. The AEC detects small glitches by applying a moving average or filter to smooth the relative sample offset, and identifies a glitch for changes in the smoothed sample offset over a defined threshold within a certain time period.

During glitch recovery, the described AEC temporarily suspends updating the adaptive filter on which the echo prediction is based, while adjusting the buffer alignment. This prevents the buffer alignment adjustment from affecting the filter coefficients, and otherwise avoids delay that would result had the filter coefficients been reset.

The described AEC also handles clock drift between the microphone and speaker signal streams. In the case of low rates of clock drift, the AEC uses a multi-step compensation approach, which significantly improves AEC quality over a single step compensation approach. In the case of high rates of clock drift, AEC inserts a resampler in one of the stream paths, and adapts the resampling to compensate the measured clock drift.

Additionally, the described AEC implements and anti-clipping technique. When the AEC detects clipping in the microphone and/or speaker signals, the AEC suspends adaptive filter updating. This prevents the clipping from adversely impacting the room response represented by the adaptive filter coefficients. The updating process resumes so that the filter adapts to change in the actual room response when the clipping ceases.

This Summary is provided to introduce a selection of concepts in a simplified form that is further described below in the Detailed Description. This summary is not intended to identify key features or essential features of the claimed subject matter, nor is it intended to be used as an aid in determining the scope of the claimed subject matter. Additional features and advantages of the invention will be made apparent from the following detailed description of embodiments that proceeds with reference to the accompanying drawings.

DETAILED DESCRIPTION

The following description relates to implementations of audio echo cancellation having improved robustness and quality, and their application in two-way audio/voice communication systems (e.g., traditional or internet-based telephony, voice chat, and other two-way audio/voice communications). Although the following description illustrates the inventive audio echo cancellation in the context of an internet-based voice telephony, it should be understood that this approach also can be applied to other two-way audio communication systems and like applications.

1. Quality Issues in Audio Echo Cancellation

Figure 4:
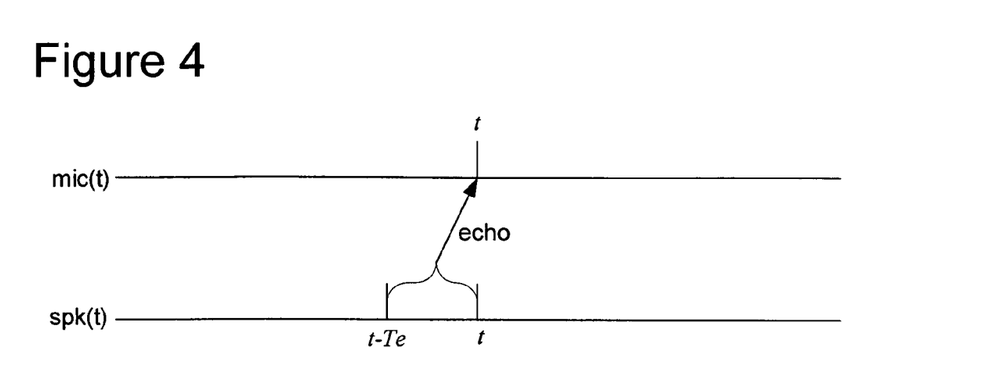
FIG. 4 is a continuous time line illustrating the relationship of the microphone and speaker signals in the echo prediction.

One important piece of information that the AEC 210 (FIG. 3) needs to know for the prediction is the corresponding relationship between samples in the microphone signal mic[n] and the speaker signal spk[n]. Basically, the AEC 210 needs to know which samples in the speaker signal spk[n] are needed to predict the echo at a given sample in the microphone signal mic[n], so that it can cancel the echo. In continuous time, the above equation (1) shows that we can use the speaker signal in time range of $[t-T_e, t]$ to predict echo at time t. FIG. 4 illustrates the relationship between the microphone signal sample mic[i] and the speaker signal samples spk[n] from which it is predicted on a continuous time line.

The AEC 210 works with discrete time signals (i.e., mic[n] and spk[n]), and needs to determine which samples in the speaker signal (spk[n]) stream contribute to the echo at a particular sample (mic[i]) in the microphone signal. However, in practice, the AEC 210 operates on two streams of microphone and speaker samples, which generally are sampled by two different sampling clocks and may each be subject to delays. Accordingly, the same indices in the two streams may not be necessarily aligned in physical time.

The AEC implementation (with improved robustness and quality) described herein addresses this issue by introducing an important quantity d[i], which indicates a relative sample offset (with respect to physical time) between the two streams.

Conceptually, the relative sample offset d[i] is computed as follows:

1. Given a microphone signal sample mic[i], we first need to find when mic[i] was generated by the A/D converter 120 (FIG. 1). Suppose, it is time τ. So, at time t, the A/D converter digitizes mic(τ) is digitized to mic[i].
2. According to equation (1), we know the echo at mic(τ) is from spk(t) during a short time interval $t=[\tau-T_e, r]$ preceding the time τ.
3. Next, the AEC finds which samples in the digital stream of the speaker signal spk[n] are in the time range of $[\tau-T_e, \tau]$. Assume, the AEC finds an index j of speaker stream such that spk[j] is played back at time τ at the speaker, then we have can define the relative sample offset as a difference of the indices, or d[i]=i−j. In other words, the AEC finds a sample spk[j] in the speaker signal stream that is rendered at the same as the microphone signal sample mic[i] is captured. The index difference between these two samples is the relative sample offset d[i] between the streams at time τ.

Figure 5:
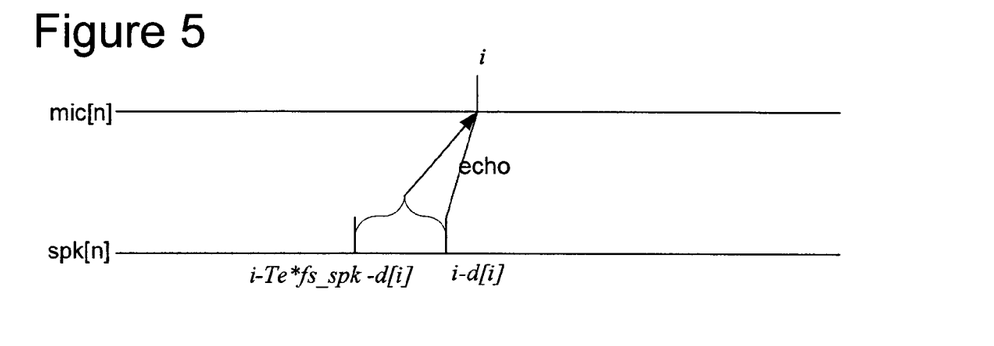
FIG. 5 is a continuous time line illustrating the relationship of the microphone and speaker signals in the echo prediction.

FIG. 5 illustrates the role that the relative sample offset d[i] has to the relationship of the microphone signal sample mic[i] to the speaker signal samples spk[n] from which the echo at mic[i] was introduced. As shown in this time line, the echo at mic[i] comes from the spk[n] samples within the interval $(i-T_e f_s - d[i])$ to $(i-d[i])$. In the ideal scenario, d[i] could be 0 or a constant. However, in reality the relative sample offset is not because of following two reasons.

(1) There is time-varying delay in the sample paths for both capturing and playback. The latest microphone samples that enter the AEC computation were actually captured some time ago; and similarly the latest speaker samples sent to render device will be rendered some time later.

(2) When capture and render clocks run on different crystals, the microphone signal and speaker signal may be captured and rendered at different actual clock frequencies even though their nominal frequencies are the same. In other words, sampling rate on capture and render device may be slightly different. This phenomenon is usually referred to as clock drifting. So, the two streams might lose alignment even if they are aligned at the beginning.

If the precise sampling rates ($fs_{mic}$ and $fs_{spk}$) of the microphone and speaker signals is known, the relative sample offset d[i] can be calculated as a linear function of i:

$$d[i] = (fs_{mic} - fs_{spk})/fs_{mic} \times i - C \quad (2)$$

where C is a constant related to the initial buffer fullness when the two-way communication system starts up.

In practical systems, the precise sampling rates ($fs_{mic}$ and $fs_{spk}$) can not be directly known. Fortunately, the programming interface (API) of modern audio hardware provides information of the buffer fullness, streaming position, timestamp information or other equivalent information, which can establish the relationship between mic[t] and mic[n], and between spk[t] and spk[n]. Similarly, we can use the three steps we described above to compute the relative sample offset d[i].

The real value of the relative sample offset d[i] is a noisy linear line with occasional jumps due to following additional two reasons:

(3) Buffer fullness, streaming position or timestamp measurement can not be noise free.
(4) A glitch may happen. When a glitch happens, the system may lose some microphone samples or cause more delays in playback. So, even if samples are aligned at the beginning, they will no longer be aligned after glitches occur.

As we can see know, due to the aforementioned reasons (1) through (4), a graph of the relative sample offset d[n] over time produces a noisy, linearly increasing line with occasional jumps. These imperfections introduce quality problems for the AEC. In some cases, the variability of d[n] could cause the AEC to fail completely. The AEC implementations described herein below focus on how to improve AEC quality and robustness when the relative sample offset d[i] is not perfect in practical systems.

2. Relative Sample Offset Calculation

As just discussed, calculating and processing the relative sample offset d[i] between the microphone and speaker signals are essential to AEC quality. Moreover, there are several equivalent ways to do this. For example, the relative sample offset can be readily calculated from information on the streaming position, buffer fullness and timestamp of the signal streams. The AEC with improved robustness and quality implementation described herein calculates and processes the relative sample offset d[i] directly, using conventional procedures. Note that the relative sample offset d[i] can be any rational number, not integers only.

2.1 Quality of d[i] Calculation

As we discussed earlier, successful AEC requires the microphone and speaker streams to be aligned to same physical time instant but it can tolerate constant offset between the two streams. Ideally, a graph of the relative sample offset should be just a flat straight line. However, there is not a constant offset in reality due to at least the following three reasons.

First, there could be clock drifting. Clock drifting causes the relative sample offset graph to form an inclined line. Clock drifting refers to a scenario where the render and capture signals are sampled at different clock rates (frequencies). This may be caused by capture and render devices being on different cards (using different crystals), or it may be caused by an imperfect sampling rate converter in the audio device driver or the audio mixer. The drifting rate is a non-dimensional ratio to describe time difference between two clocks in a unit time period.

Second, when a glitch happens in one stream, then the relative sample offset will have a discontinuity. The speaker or microphone buffers can be adjusted accordingly in the AEC to re-align the two streams.

Third, in reality, the relative sample offset d[i] may have noise. The noise may be caused by limited numerical precision, data transfer delay, multi-threading, unavailability of certain information, and etc. The noise is normally random. In some cases, the noise may show some patterns, but they are still unpredictable. The noise level is described by variance.

For improved AEC quality, the AEC implementation described herein estimates the quality of the relative sample offset d[i] calculation, before adjusting the microphone/speaker buffers. The AEC implementation uses three quantities to record the relative sample offset d[i] quality: drifting rate, variance, and number of frames used to calculate drifting rate and variance.

The AEC implementation applies a linear regression model to calculate the drifting rate and variance. Basically, the AEC implementation denotes the relative sample offset as a function of frame number (d[i]). In the general case, the timestamp is a function of sample number, and can alternatively be used. In an AEC implementation where the frame size is fixed, the frame number can be used. The AEC implementation calculates the drifting rate and variance by fitting d[i] into a linear relationship with number of frames (i.e., $\tilde{d}[i] = a + D \cdot i$), with a condition that $$\sum |d[i] - \tilde{d}[i]|^2$$

is minimal, where $\tilde{d}[i]$ is the best-fit linear estimate; i is frame number; D is clock drifting rate; and a is a constant that accounts for any initial sample offset. If we denote error between the actual sample offset and the linear model as $e[i] = d[i] - \tilde{d}[i]$, then the sample offset variance is given by variance of the error.

Applying linear regression, the clock drifting rate is given by $$D = \frac{\sum_{i=1}^{N} [i - M_i] \cdot [d[i] - M_d]}{\sum_{i=1}^{N} [d[i] - M_d] \cdot [d[i] - M_d]},$$

$$a = M_d - D * M_i,$$

where $$M_i = \frac{1}{N}\sum_{i=1}^{N} i, \quad M_d = \frac{1}{N}\sum_{i=1}^{N} d[i]$$

are mean of frame number and sample offset, respectively.

The sample offset error is given by e[i]=d[i]−(a+D·i). We can easily find that the error mean is zero, so the variance can be written as $$V = \text{Var}(e) = \frac{1}{N}\sum_{i=1}^{N} e[i]^2$$

However, in practice, the AEC implementation is able to update the drifting rate and variance for every frame during running time without keeping histories of sample offsets. For this end, the above formulas can be modified as follows.

Let $$S_i = \sum_{i=1}^{N} i, \; S_d = \sum_{i=1}^{N} d[i], \; S_{ii} = \sum_{i=1}^{N} i^2,$$

$$S_{dd} = \sum_{i=1}^{N} d[i]^2, \text{ and } S_{id} = \sum_{i=1}^{N} i \cdot d[i].$$

Then clock drifting rate and variance can be written as $$D = \frac{(S_{id} - S_i S_d / N)}{(S_{dd} - S_d S_d / N)},$$

$$a = S_d / N - D * S_i / N,$$

$$V = (S_{dd} - 2D \cdot S_i S_d + D^2 \cdot S_{ii} - 2a \cdot S_d + 2aD \cdot S_i)/N + a^2.$$

Note that the drifting rate and variance are also functions of number of frames N. If the error in the relative sample offset d[i] is a stationary random process, the clock drifting rate and variance calculated by these formulas approach their true values asymptotically as the number of frames N increases. The larger the number of frames N, the more accurate the results are. Practically, the drifting rate and variance converges in several seconds. However, the drifting rate and variance may not be stationary in practice. They may vary slowly with time when environmental conditions are changed. So if the current estimations have been running for more than 200 seconds, the AEC resets these estimates to use the most recent data.

As discussed more fully in the following sections, the AEC implementation assesses or categorizes the quality of the relative sample offset based on its calculation of the sample offset variance. The AEC implementation uses roughly three categories: "good for all process," "not good for small glitch detection," and "bad for all process." The AEC implementation then adapts its glitch detection and compensation behaviors (as discussed more fully below) according to this assessment of the sample offset quality.

More specifically, the AEC determines whether the sample offset variance measurement falls within one of three predefined ranges of these three categories. The ranges for the categories are predefined based on empirical results (i.e., quality range at which the glitch detection processes have been found to operate effectively). When the sample offset variance is low (i.e., in the "good for all process" range), the AEC applies both large and small glitch detection described below. When the sample offset variance is within a medium range (the "not good for small glitch detection" category), the AEC ceases the process of small glitch detection, while continuing the process for large glitch detection described below.

Finally, when the variance is too high for either process, the AEC ceases to perform both large and small glitch detection processes.

2.2 Glitch Detection

The AEC implementation distinguishes between two types of glitch: small and large. In other words, glitches are distinguished by size, which is defined as the amount of time discontinuity when the glitch occurs. The large glitch threshold is chosen such that it is significantly larger than the maximum sample offset error. On this basis, a large glitch can be identified immediately. On the other hand, if the glitch is small, particularly when glitch size is comparable to the sample offset error range, then it cannot be determined whether or not the time discontinuity is caused by a glitch or just sample offset noise.

In order to detect small glitches, the AEC implementation applies a Move-Average (MA) filter to the sample offset d[i]. The MA filter operates to calculate an average value of d[i] inside a sliding window with size L:

$$d_{MA}[i] = \frac{1}{L}\sum_{l=0}^{L-1} d[i-l].$$

If the smoothed sample offset $d_{MA}[i]$ has a change larger than a predefined small glitch threshold within a certain period, then a small glitch is identified.

Figure 6:
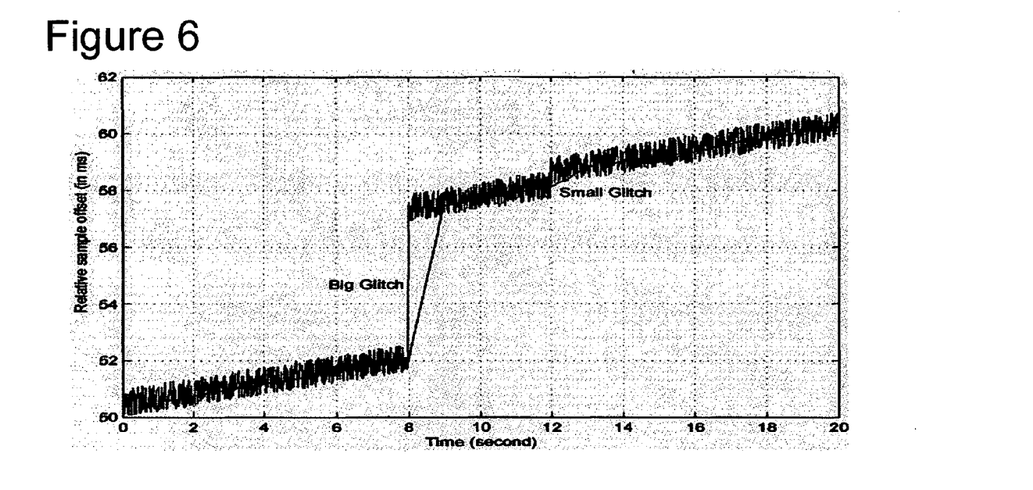
FIG. 6 is a graph of the relative sample offset illustrating examples of large and small glitches. In the graph, the calculated sample offset between render and capture streams is shown in blue, while a red line shows the filtered (smoothed) sample offset. For convenience, sample numbers and frame numbers are converted to time. In this case, the clock drifting is about 0.0002, i.e. 2 ms drift for every 10 seconds, and the range of noise is about 1 ms.

FIG. 6 shows an example of small and large glitches in the relative sample offset. The relative sample offset d[i] is shown as a blue line, while the smoothed sample offset is shown in red. For convenience, the sample numbers and frame number are converted into time. In the illustrated example, the clocking drifting rate is 0.0002, and the variance is 0.083 (ms²). At 8 second, there is a big glitch with size of 5.3 ms, which can be detected immediately. At 12 second, there is a small glitch of 0.5 ms, which is about the same amount as the maximum sample offset error, such that the change cannot be immediately distinguished as a glitch. Instead, after about 1 second, when an obvious change is detected in the smoothed sample offset (shown as a red line), the small glitch is identified. The AEC implementation further applies a drifting rate correction (i.e., de-trend) before small glitch detection.

This small glitch detection relies on a good estimation of clock drifting rate and noise variance. The smoothed sample offset also has noise with a variance of the raw sample offset variance divided by MA filter size. In order to make smoothed sample offset have a relatively constant noise level, the MA filter size needs to be adjusted according to the raw sample offset variance. Further, if the noise level of the raw sample offset is too high, a very large filter size is needed, which may cause robustness issues. The AEC implementation thus disables small glitch detection for a high noise level, which is indicated by "not good for small glitch detection" quality flag.

2.3 Fast Glitch Recovery

If a glitch happens, the microphone and speaker streams are out of alignment. The AEC then needs to re-align the two streams. After re-alignment, the AEC could either reset the adaptive filter 310 (FIG. 3) coefficients or start updating the coefficients immediately. But in reality both methods have problems. If the adaptive filter coefficients are reset, the AEC would take several seconds to find the room response again and echo would likely be heard during that period of time. If the AEC starts updating coefficients immediately, the adaptive filter could diverge or drift away from its optimal values since the samples in the buffer are not continuous due to the glitch.

Instead, the illustrated AEC implementation does the following after detecting a glitch:
(1) Adjusts microphone or speaker buffer to align render and capture streams;
(2) For all samples involved in the buffer adjustment (step (1)), stops updating the adaptive filter coefficients;
(3) After all samples involved in the adjustment are passed, resumes updating the adaptive filter coefficients.

This approach improves the quality of the AEC after glitches.

3. Multi-Step Low Clock Drifting Rate Compensation

If there is drifting between microphone and speaker streams, the AEC adjusts one of the stream buffers to align the streams. In the time domain, the AEC can only adjust the stream buffers for integer number of samples, although the drifting happens continuously and accumulates gradually. So if clock drifting exists, the AEC adjusts one stream buffer for one sample when accumulative drifting is greater than one sample. We call this uni-step clock compensation, as the adjustment is always one sample.

However, even one sample shift in the time domain will cause a great amount of phase change in the frequency domain, particularly at high frequencies. This phase change can be enough to cause the AEC adaptive filters to diverge and cause noticeable AEC quality degradation, although such quality degradation may only last for several tens of milliseconds. In situations where high quality audio is demanded, such AEC quality degradation desirably is eliminated to the extent possible.

For improved quality, the clocking drifting compensation should be applied similar to how clock drifting occurs, i.e., the compensation should be applied gradually and continuously with time, instead of in single step adjustments. Accordingly, the illustrated AEC implementation applies a method that we call multi-step clock compensation. The basic idea is to split a one-sample adjustment into many small steps, so that the phase changes are small enough that the AEC adaptive filters are able to catch up the phase changes easily without inducing quality degradation. Because the AEC cannot adjust stream buffers for a fraction of a sample in the time domain, a frequency compensation method is applied.

3.1 Multi-Step Clock Compensation in Frequency Domain

Assume x[n] is a stream buffer and X[k] is its DFT (discrete Fourier transform). In case the buffer stream is adjusted for one sample delay, i.e., x'[n]=x[n−1], the spectrum of the adjusted signal is given by $$X'[k]=X[k]\cdot \exp(-j2\pi k/N), \qquad (1)$$

where N is the DFT size, and $\exp(-j2\pi k/N)$ is the phase change due to the one-sample delay. The phase change is linear with respect to frequency. At high frequencies, the phase change is significant, which will make the AEC adaptive filters diverge. Therefore, the solution is to split the one-sample compensation into M steps and evenly apply them in M consecutive frames as given by equation (2):

$$X''[k]=X[k]\cdot \exp[-j2\pi k/(N*M)]. \qquad (2)$$

Such compensation is equivalent to applying 1/M sample delay in time domain:

$$x''[n]=x[n-1/M]. \qquad (3)$$

where 1/M is called step size. Note that (3) can not be done in time domain.

Figure 7:
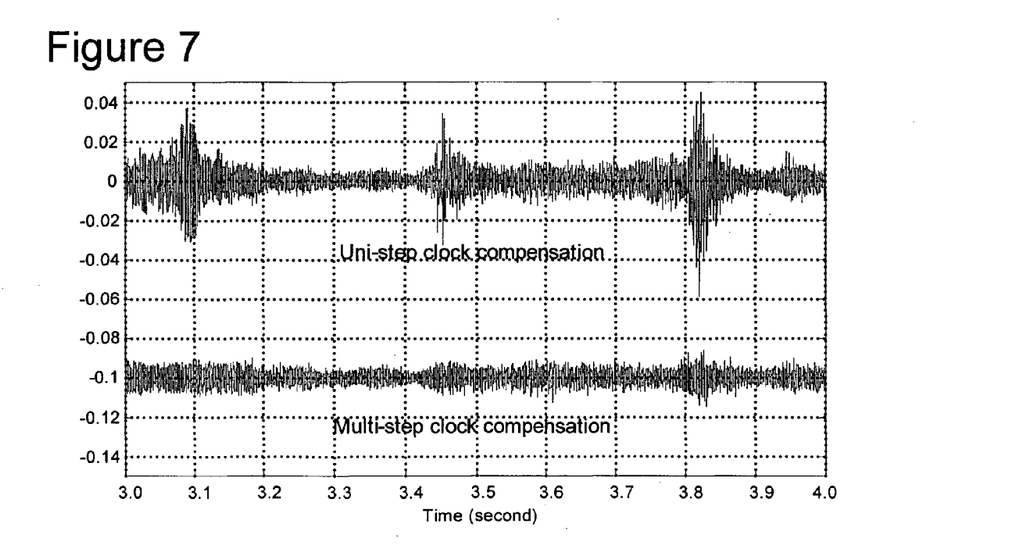
FIG. 7 is a graph showing examples of uni-step and multi-step clock compensation.

An example of the continuous clock compensation is shown in FIG. 7. The original data shown in the figure is sampled at 16 kHz, and it has clock drifting rate of 1.7×10−4, which needs one-sample adjustment for every 0.37 seconds. As shown in the figure, there are three adjustments at 3.08, 3.45, and 3.82 second, respectively. The blue line shows the AEC output using the uni-step compensation method, and the red line shows the AEC output using the multi-step compensation approach. The multi-step compensation method has clearly better quality and yields much smoother output with very low echo level, while with the uni-step compensation method the echo level rises right after the adjustment and the degradation lasts about 50-100 milliseconds. In terms of ERLE (Echo Return Loss Enhancement) value, we observe about 6-7 dB local improvement, and about 2 dB average improvement.

It should be noted that the multi-step clock compensation is only helpful when the drifting rate is significantly less than 1 sample/frame. If the drifting rate is larger or close to 1 sample/frame, then it is not meaningful to use this method. Empirically, this method works effectively when the drifting rate is 0.001 or lower. At higher rates of clock drifting, the AEC implementation uses the high drifting rate compensation described in the next section.

3.2 Adaptive Step Size Determination

One problem in the multi-step clock compensation method is how to determine an optimal step size 1/M. Ideally, to completely compensate for clock drifting, the step size should match the clock drifting rate, i.e., 1/M=DriftingRate*FrameSize. However, in practice the step size can be larger than the ideal value, as long as it is small enough not to cause the AEC adaptive filters to diverge. But by all means, it should be changed automatically according to actual drifting rate, which may be different on different machines and is hard to be determined a priori. The AEC implementation uses an adaptive way to determine the step size.

The AEC implementation first sets an initial value to the step size $S_i$, for instance, $S_i$=0.01. Then, the actual step size is given by $$1/M=S_i*|P|,$$

where P is total samples pending for phase compensation, which is a rational number. Whenever there is a one-sample adjustment for stream buffers, P will be increased or decreased by one. At each following data frame, if $|P|>S_i$, then a phase compensation $\exp[-j2\pi k\cdot P/N]$ will be applied to that frame. After the compensation, P will be subtracted by 1/M.

Therefore, if the actually drifting rate is less than $S_i$/FrameSize, P will become zero before it gets incremented or decremented again. The step size 1/M will become zero too, and then compensation stops. On the other hand, if the actual drifting rate is greater than $S_i$/FrameSize, P will be incremented or decremented again before it becomes zero. The step size 1/M will be increased accordingly so that it compensates faster. In this way, the step size 1/M will be automatically updated to match the actual drifting rate. In the example shown in FIG. 7, the step size changes between 0.02 and 0.03, and the long term average matches the actual drifting rate.

4. High Clock Drifting Rate Compensation

If there is clock drifting and the accumulative drift is over one sample (e.g., based on the clock drifting calculation described above), then the AEC implementation can adjust the microphone or speaker buffer by one sample to compensate. In the case of an AEC that runs separate adaptive filters in multiple frequency sub-bands, even one sample shift in the time domain will cause noticeable change in high frequency sub-bands. So when the clock drifting rate is high, and the AEC adjusts the microphone/speaker signal buffers very often, the quality of AEC is adversely affected. Moreover, the higher the drifting rate becomes, the greater the quality loss. Empirically, if the clock drifting rate is higher than 0.001, there will be noticeable quality degradation when the buffers are adjusted.

In our AEC implementation, the AEC inserts a resampler onto the render or capture stream to remove the clock drifting. The AEC then causes this resampler to resample that stream according to the measured clock drift. The resampler may not be able to completely remove the clock drifting, but it will significantly reduce chance of buffer adjustment and hence improve the AEC quality.

5. Anti-Clipping

As mentioned in the first section, echo can be modeled as a convolution of the speaker signal and room response, which is a linear process. Therefore, the AEC implementation is able to cancel the echo using adaptive filtering techniques. If there is any nonlinear effect involved during the playback or capture, then the AEC may fail. A common nonlinear effect is microphone clipping, which happens when analog gain on the capture device is too high causing the input analog signal to be out of the range of the A/D converter. The A/D converter then clips the out of range analog input signal samples to its maximum or minimum range values. When clipping happens, the adaptive filter coefficients will be corrupted. Even after clipping has ended, the impacts are still there and AEC needs another few seconds to re-adapt to find the correct room response.

To detect clipping, the AEC implementation checks the capture (microphone signal) stream. If a microphone signal sample is equal to the maximum positive value (e.g., 32767 for a 16 bit device) or the maximum negative value (e.g., −32768 for a 16 bit device), the AEC implementation detects clipping has occurred. When clipping happens, the AEC implementation suspends updating the adaptive filter 310 coefficients. This way, the adaptive filter coefficients at the start of clipping are retained and remain valid until after clipping ends. Assuming the room response does not change very fast in a short period, the AEC implementation can thus quickly recover from the clipping and find the correctly room response.

6. Computing Environment

The above-described robust, high quality AEC digital signal processing techniques can be realized on any of a variety of two-way communication systems, including among other examples, computers; speaker telephones; two-way radio; game consoles; conferencing equipment; and etc. The AEC digital signal processing techniques can be implemented in hardware circuitry, in firmware controlling audio digital signal processing hardware, as well as in communication software executing within a computer or other computing environment, such as shown in FIG. 8.

Figure 8:
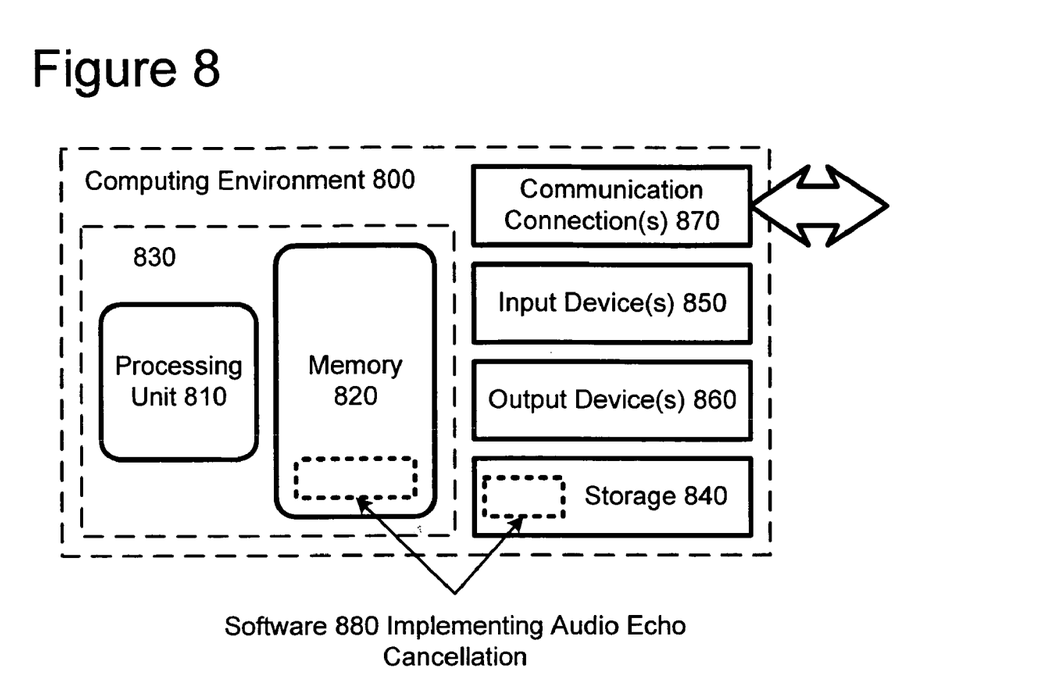
FIG. 8 is a block diagram of a suitable computing environment for implementing a two-way communication system utilizing the AEC implementation having improved robustness and quality.

FIG. 8 illustrates a generalized example of a suitable computing environment (800) in which described embodiments may be implemented. The computing environment (800) is not intended to suggest any limitation as to scope of use or functionality of the invention, as the present invention may be implemented in diverse general-purpose or special-purpose computing environments.

With reference to FIG. 8, the computing environment (800) includes at least one processing unit (810) and memory (820). In FIG. 8, this most basic configuration (830) is included within a dashed line. The processing unit (810) executes computer-executable instructions and may be a real or a virtual processor. In a multi-processing system, multiple processing units execute computer-executable instructions to increase processing power. The memory (820) may be volatile memory (e.g., registers, cache, RAM), non-volatile memory (e.g., ROM, EEPROM, flash memory, etc.), or some combination of the two. The memory (820) stores software (880) implementing the described audio digital signal processing for robust and high quality AEC.

A computing environment may have additional features. For example, the computing environment (800) includes storage (840), one or more input devices (850), one or more output devices (860), and one or more communication connections (870). An interconnection mechanism (not shown) such as a bus, controller, or network interconnects the components of the computing environment (800). Typically, operating system software (not shown) provides an operating environment for other software executing in the computing environment (800), and coordinates activities of the components of the computing environment (800).

The storage (840) may be removable or non-removable, and includes magnetic disks, magnetic tapes or cassettes, CD-ROMs, CD-RWs, DVDs, or any other medium which can be used to store information and which can be accessed within the computing environment (800). The storage (840) stores instructions for the software (880) implementing the described audio digital signal processing for robust and high quality AEC.

The input device(s) (850) may be a touch input device such as a keyboard, mouse, pen, or trackball, a voice input device, a scanning device, or another device that provides input to the computing environment (800). For audio, the input device(s) (850) may be a sound card or similar device that accepts audio input in analog or digital form, or a CD-ROM reader that provides audio samples to the computing environment. The output device(s) (860) may be a display, printer, speaker, CD-writer, or another device that provides output from the computing environment (800).

The communication connection(s) (870) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The described audio digital signal processing for robust and high quality AEC techniques herein can be described in the general context of computer-readable media. Computer-readable media are any available media that can be accessed within a computing environment. By way of example, and not limitation, with the computing environment (800), computer-readable media include memory (820), storage (840), communication media, and combinations of any of the above.

The described audio digital signal processing for robust and high quality AEC techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

We claim:

1. A method of digital signal processing for enhancing audio echo cancellation in a two-way communication system, the method comprising:

performing at least one quality measurement of a relative sample offset between a rendered signal and a captured signal in the two-way communication system, wherein the at least one quality measurement includes variance of the relative sample offset; and enhancing audio echo cancellation by selectively determining whether to perform at least one correction process based on the quality measurement, the audio echo cancellation predicting echo from the rendered signal in the captured signal based on an adaptive filter with the rendered and captured signals aligned in physical time according to the relative sample offset between the rendered and captured signals, wherein selectively determining whether to perform the at least one correction process comprises at least one of:

determining to perform large glitch detection and small glitch detection if the variance is within a low variance range;

determining to perform large glitch detection but not small glitch detection if the variance is within a middle range; and determining to perform neither large or small glitch detection if the variance is in a high range.

2. The method of claim 1 wherein the variance of the relative sample offset is measured by applying model fitting for a number of frames of the signals.

3. The method of claim 1 wherein said selectively determining whether to perform at least one correction process comprises:

determining to perform large glitch detection and small glitch detection if the variance is within a low variance range;

determining to perform large glitch detection but not small glitch detection if the variance is within a middle range; and determining to perform neither large or small glitch detection if the variance is in a high range.

4. The method of claim 1 wherein said at least one correction process includes small glitch detection, the small glitch detection comprising:

performing smoothing of the relative sample offset; and identifying that a small glitch has occurred when the smoothed relative sample offset has changed more than a threshold amount within a time interval.

5. The method of claim 4 wherein the small glitch detection further comprises:

applying a move-average filter to effect the smoothing of the relative sample offset; and adjusting size of the move-average filter according to the variance of the relative sample offset.

6. The method of claim 1 wherein said at least one correction process includes large glitch detection, the large glitch detection comprising:

comparing the relative sample offset calculated for successive frames of the signals;

when the relative sample offset of the successive frames is larger than a threshold amount, identifying that a large glitch has occurred; and adjusting alignment of the signals for audio echo cancellation in accordance with the change in the relative sample offset to effect recovery from the large glitch.

7. The method of claim 6 wherein recovery from the identified large glitch is effected without resetting the adaptive filter coefficients of the audio echo cancellation.

8. The method of claim 7 wherein said large glitch recovery further comprises:

suspending updating the adaptive filter coefficients while adjusting alignment of the signals until after any samples of the signals affected by said adjusting have been processed by the adaptive filter.

9. The method of claim 1 wherein the quality measurement further includes clock drift.

10. The method of claim 9 further comprising resampling one of the signals according to the measured clock drift to thereby minimize signal alignment adjustments.

11. The method of claim 1 further comprising:

detecting occurrence of clipping in the signals; and suspending updating the adaptive filter coefficients while clipping is detected.

12. The method of claim 1, wherein the sample offset variance is calculated based on a sample offset error $d[i]-\tilde{d}[i]$, wherein $d[i]$, $\tilde{d}[i]$ are relative sample offset as a function of frame number i and a linear fit to sample offset as a function of i, respectively.

13. The method of claim 12, wherein the linear fit $\tilde{d}[i]$ is calculated as $\tilde{d}[i]=a+D\cdot i$, wherein D is a clock drift rate calculated as $$D = \frac{\sum_{i=1}^{N}[i-M_i]\cdot[d[i]-M_d]}{\sum_{i=1}^{N}[d[i]-M_d]\cdot[d[i]-M_d]}, a = M_d - D*M_i,$$

and wherein $$M_i = \frac{1}{N}\sum_{i=1}^{N} i$$

is mean frame number, $$M_d = \frac{1}{N}\sum_{i=1}^{N} d[i]$$

is the mean sample offset, and N is a number of frames.

14. The method of claim 13, wherein the sample offset variance is calculated as $(S_{dd}-2D\cdot S_i S_d+D^2\cdot S_{ii}-2a\cdot S_d+2aD\cdot S_i)/N+a^2$, wherein $$S_i = \sum_{i=1}^{N} i, \; S_d = \sum_{i=1}^{N} d[i], \; S_{ii} = \sum_{i=1}^{N} i^2, \; S_{dd} = \sum_{i=1}^{N} d[i]^2, \; S_{id} = \sum_{i=1}^{N} i \cdot d[i],$$

15. A communication end device of a two-way communication system, the device comprising:
   an audio signal capture device for capturing local audio to be transmitted to another end device;
   an audio signal rendering device for playing remote audio received from the other end device;
   buffers for buffering the captured and rendered audio signals; and an audio echo canceller operating to:
   predict echo from the rendered audio signal based on an adaptive filter with the captured and rendered signals being aligned in physical time according to a calculated relative sample offset between the captured and rendered signals,
   subtract the predicted echo from the signal transmitted to the other end device, perform at least one quality measurement of the calculated relative sample offset of the signals, wherein the at least one quality measurement includes variance of the relative sample offset, and
   selectively determine whether to perform at least one recovery process based on the quality measurement, wherein selectively determine whether to perform the at least one correction process comprises at least one of:
   determine to perform large glitch detection and small glitch detection if the variance is within a low variance range,
   determine to perform large glitch detection but not small glitch detection if the variance is within a middle range, and
   determine to perform neither large or small glitch detection if the variance is in a high range.

16. The communication end device of claim 15 wherein said performance of at least one quality measurement comprises measuring clock drift and variance of the relative sample offset by applying a linear regression fit for a number of frames of the signals.

17. The communication end device of claim 16 wherein said small glitch detection comprises: performing smoothing of the relative sample offset, and identifying that a small glitch has occurred when the smoothed relative sample offset has changed more than a threshold amount within a time interval.

18. The communication end device of claim 16 wherein said large glitch detection comprises:
   comparing the relative sample offset calculated for successive frames of the signals;
   when the relative sample offset of the successive frames is larger than a threshold amount, identifying that a large glitch has occurred; and adjusting alignment of the signals in the buffers in accordance with the change in the relative sample offset without resetting coefficients of the adaptive filter to effect recovery from the large glitch.

19. The communication end device of claim 18 wherein said audio echo canceller further operates during recovery from the large glitch to suspend updating the adaptive filter coefficients while adjusting alignment of the signals until after any samples of the signals affected by said adjusting have been processed by the adaptive filter.

20. The communication end device of claim 16 further comprising:
   a resampler in a path of one of the signals, the resampler operating to resample the signal in the path according to the measured clock drift to thereby minimize signal alignment adjustments.

21. The communication end device of claim 15 wherein said audio echo canceller further operates to detect occurrence of clipping in the signals, and to suspend updating the adaptive filter coefficients while clipping is detected.

* * * * *